(12) United States Patent
Damnjanovic et al.

(10) Patent No.: US 8,971,257 B2
(45) Date of Patent: Mar. 3, 2015

(54) PCFICH DESIGN FOR MULTICARRIER OPERATION

(75) Inventors: Jelena M. Damnjanovic, Del Mar, CA (US); Naga Bhushan, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1054 days.

(21) Appl. No.: 12/764,347

(22) Filed: Apr. 21, 2010

(65) Prior Publication Data

US 2011/0096734 A1 Apr. 28, 2011

Related U.S. Application Data

(60) Provisional application No. 61/174,437, filed on Apr. 30, 2009.

(51) Int. Cl.
*H04W 72/04* (2009.01)
*H04L 5/00* (2006.01)

(52) U.S. Cl.
CPC ......... *H04L 5/0053* (2013.01); *H04W 72/0453* (2013.01); *H04L 5/0007* (2013.01); *H04W 72/042* (2013.01)
USPC ............ 370/329; 370/336; 370/344; 455/450

(58) Field of Classification Search
CPC ..... H04W 24/00; H04W 80/04; H04W 84/12; H04W 88/06; H04W 84/18; H04B 17/003; H04L 43/50; H04L 43/0852; H04L 43/08

USPC ................. 370/328, 329, 330, 336–337, 342, 370/344–345, 479–480; 455/450, 452.1, 455/452.2
See application file for complete search history.

(56) References Cited

U.S. PATENT DOCUMENTS 7,894,330 B2 * 2/2011 Lee et al. ...................... 370/208
8,208,438 B2 * 6/2012 Han et al. ...................... 370/330
(Continued)

FOREIGN PATENT DOCUMENTS

WO 2008084392 A2 7/2008
WO 2008084624 A1 7/2008
(Continued)

OTHER PUBLICATIONS

"Carrier Aggregation in Heterogeneous Networks", Source: Qualcomm Europe, 3GPP TSG RAN WG1 #56bis, R1-091459, Seoul, Korea, Mar. 23-27, 2009.
(Continued)

*Primary Examiner* — Candal Elpenord
(74) *Attorney, Agent, or Firm* — Paul Kuo

(57) ABSTRACT

Systems and methodologies are described that facilitates communicating Physical Control Format Indicator Channel (PCFICH) information to a user equipment (UE) in which the PCFICH information is specific to a particular component carrier. The PCFICH information for each component carrier can be communicated via an anchor component carrier in order to reduce decoding each PCFICH information for each component carrier. In particular, the PCFICH information can be decoded for an anchor component carrier and PCFICH information for additional carriers can be included in a Multi-Carrier (MC) grant of the Physical Downlink Control Channel (PDCCH).

26 Claims, 11 Drawing Sheets

(56) References Cited

U.S. PATENT DOCUMENTS

| | | | |
|---|---|---|---|
| 2007/0242636 A1 | 10/2007 | Kashima et al. | |
| 2009/0268831 A1* | 10/2009 | Onggosanusi et al. | 375/260 |
| 2009/0290597 A1* | 11/2009 | Baumgartner et al. | 370/468 |
| 2010/0135237 A1* | 6/2010 | Papasakellariou et al. | 370/329 |
| 2010/0195583 A1* | 8/2010 | Nory et al. | 370/329 |
| 2010/0227017 A1* | 9/2010 | Lum | 425/444 |
| 2010/0227569 A1* | 9/2010 | Bala et al. | 455/73 |
| 2010/0272017 A1* | 10/2010 | Terry et al. | 370/328 |
| 2011/0021154 A1* | 1/2011 | Marinier et al. | 455/67.11 |
| 2011/0116456 A1* | 5/2011 | Gaal et al. | 370/329 |

FOREIGN PATENT DOCUMENTS

| | | | |
|---|---|---|---|
| WO | 2009041779 A1 | 4/2009 | |
| WO | WO 2009078628 A1 | 6/2009 | |

OTHER PUBLICATIONS

"Notion of Anchor Carrier in LTE-A", Source: Qualcomm Europe, 3GPP TSG RAN WG1 #56bis, R1-091458, Seoul, Korea, Mar. 23-27, 2009.
"Multicarrier Control for LTE-Advanced", Source: Qualcomm Europe, 3GPP TSG RAN WG1 #56bis, R1-091460, Seoul, Korea, Mar. 23-27, 2009.
International Search Report and Written Opinion—PCT/US2010/033242, ISA/EPO—Jul. 1, 2011.
Nortel: "The Resource Element Mapping of PDCCH, PCFICH and PHICH", 3GPP Draft; R1-073290(Nortel Control-Re-Mapping), 3rd Generation Partnership Project (3GPP), Mobile Competence Centre ; 650, Route Des Lucioles ; F-06921 Sophia-Antipolis Cedex ; France, vol. RAN WGI, No. Athens, Greece; 20070815, Aug. 15, 2007, XP050106923, [retrieved on Aug. 15, 2007].
Qualcomm:"Notion of Anchor Carrier in LTE-A"No. R1-080356 Jan. 12, 2009, p. 1/5-5/5, XP002643731, Retrieved from the Internet: URL:http://www.3gpp.org/-Specification-Groups.
Robert Love et al., "PHY 32-1—Downlink Control Channel Design for 3GPP LTE", Wireless Communications and Networking Conference, 2008, WCNC 2008, IEEE, IEEE, Piscataway, NJ, USA, Mar. 31, 2008, pp. 813-818, XP031243734, ISBN: 978-1-4244-1997-5.
Taiwan Search Report—TW099113992—TIPO—Aug. 22, 2013.
Ericsson: "Characterization of downlink control signaling for LTE Advanced", 3GPP Draft; R1-090907, 3rd Generation Partnership Project (3GPP), Mobile Competence Centre ; 650, Route Des Lucioles ; F-06921 Sophia-Antipolis Cedex ; France, No. Athens, Greece; 20090203, Feb. 3, 2009, XP050318749, [retrieved on Feb. 3, 2009].
Fujitsu: "Anchor component carrier and preferred control signal structure," 3GPP Draft; R1-091503, SRD Generation Partnership Project (3GPP), Mobile Competence Centre ; 650, Route Des Lucioles ; F-06921 Sophia-Antipolis Cedex ; France, No. Seoul, Korea; 20090318, Mar. 18, 2009, pp. 5, XP050339062.
NTT DOCOMO: "DL Layered Control Signal Structure in LTE-Advanced," 3GPP TSG-RAN WG1#55b, R1-090311, pp. 7, Ljubljana, Slovenia, Jan. 12-16, 2009.
Panasonic "PDCCH coding and mapping for carrier aggregation," 3GPP TSG-RAN WG1#56, R1-090682, Athens, Greece, pp. 5, Feb. 9-13, 2009.
Texas Instruments: "Downlink and Uplink Control to Support Carrier Aggregation," 3GPP TSG-RAN WG1#57, R1-091838, pp. 5, San Francisco, USA, May 4-8, 2009.

\* cited by examiner

PCFICH DESIGN FOR MULTICARRIER OPERATION

CROSS-REFERENCE TO RELATED APPLICATIONS

This application claims the benefit of U.S. Provisional Patent application Ser. No. 61/174,437 entitled "PCFICH DESIGN FOR MULTICARRIER OPERATION" which was filed Apr. 30, 2009. The entirety of the aforementioned application is herein incorporated by reference.

BACKGROUND

I. Field

The following description relates generally to wireless communications, and more particularly to cross-carrier operation and distribution of control information for multiple carriers.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Area tracking within a wireless communication system enables a tracking area location for user equipment (e.g., mobile device, mobile communication apparatus, cellular device, smartphone, etc.) to be defined. Typically, a network can request or page the user equipment (UE) in which the UE can respond with such tracking area location. This enables the tracking area location of the UE to be communicated and updated to the network.

Multi-carrier systems often employ cross-carrier operations which provide good system performance. In harsh interference scenarios, control connectivity on impacted carriers is unreliable and absent. Moreover, control connectivity being absent can prevent data transmissions on these carriers. In other words, multi-carrier systems cannot distinguish for which carrier received control is applicable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates conveying control information for one or more downlink component carriers. The method can include evaluating one or more component carriers to identify Physical Control Format Indicator Channel (PCFICH) information related therewith. Further, the method can include communicating PCFICH information related to each of the one or more component carriers via one or more component carriers.

Another aspect relates to a wireless communications apparatus. The wireless communications apparatus can include at least one processor configured to evaluate one or more downlink component carriers to identify Physical Control Format Indicator Channel (PCFICH) information related therewith, and, communicate PCFICH information related to each of the one or more component carriers via one or more component carriers. Further, the wireless communications apparatus can include memory coupled to the at least one processor.

Yet another aspect relates to a wireless communications apparatus that conveys control information for one or more component carriers. The wireless communications apparatus can include means for evaluating one or more component carriers to identify Physical Control Format Indicator Channel (PCFICH) information related therewith. Additionally, the wireless communications apparatus can comprise means for communicating PCFICH information related to each of the one or more component carriers via one or more component carriers.

Still another aspect relates to a computer program product comprising a computer-readable medium having stored thereon code causing at least one computer to evaluate one or more downlink component carriers to identify Physical Control Format Indicator Channel (PCFICH) information related therewith, and communicate PCFICH information related to each of the one or more component carriers via one or more component carriers.

According to other aspects, a method that facilitates utilizing control information for one or more component carriers. The method can comprise receiving a PCFICH information on one or more downlink component carriers component carrier. Further, the method can comprise decoding the PCFICH information to identify control information for the one or more component carriers.

Another aspect relates to a wireless communications apparatus. The wireless communications apparatus can include at least one processor configured to receive a PCFICH information on one or more downlink component carriers component carrier, and decode the PCFICH information to identify control information for the one or more component carriers. Further, the wireless communications apparatus can include memory coupled to the at least one processor.

Another aspect relates to a wireless communications apparatus that utilizes control information for one or more component carriers. The wireless communications apparatus can comprise means for receiving a PCFICH information on one or more downlink component carriers component carrier. Moreover, the wireless communications apparatus can comprise means for decoding the PCFICH information to identify control information for the one or more component carriers.

Still another aspect relates to a computer program product comprising a computer-readable medium having stored thereon code for causing at least one computer to receive a PCFICH information on one or more downlink component carriers component carrier, and decode the PCFICH information to identify control information for the one or more component carriers.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
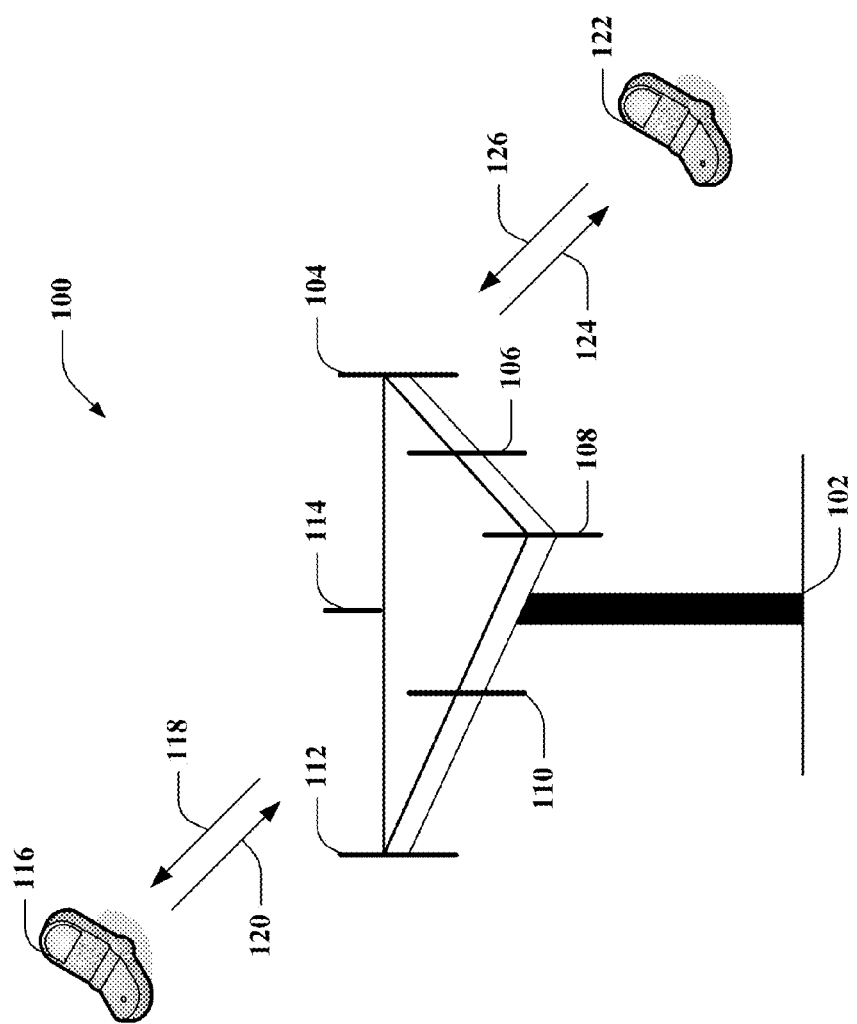
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "carrier," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, ... ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a Carrierindex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject innovation can communicate Physical Control Format Indicator Channel (PCFICH) information for an anchor component carrier and an additional component carrier in order to identify a size of a control region for each specific component carrier (e.g., a size of a control region for the anchor component carrier and a size of a control region for the additional component carrier). The anchor carrier can be the carrier that enables synchronization, access, idle state camping, and reliable control coverage for a user equipment (UE). The control for multiple carriers sent on an anchor carrier of that cell (referred as the cross-carrier control operation) can provide control for other carriers where control cannot be transmitted reliably. In particular, an anchor carrier can be utilized to communicate PCFICH information in order to allow a UE to decode PCFICH information to identify a number of symbols for control. Moreover, the anchor component carrier can include PCFICH information for additional component carriers which can be identified without decoding such PCFICH information for each additional component carrier. In one example, the PCFICH information respective to each component carrier can be included in a grant transmitted on the Physical Downlink Control Channel (PDCCH). The grant can be a single carrier that carries data assignment for one carrier or a Multi-Carrier (MC) grant that carries data assignment for all configured carriers. In another example, the PCFICH information can be packaged and communicated on a separate channel via the anchor component carrier. In general, the subject innovation can utilize an anchor component carrier to communicate PCFICH information for the anchor component carrier and respective PCFICH information for an additional carrier(s).

Figure 2:
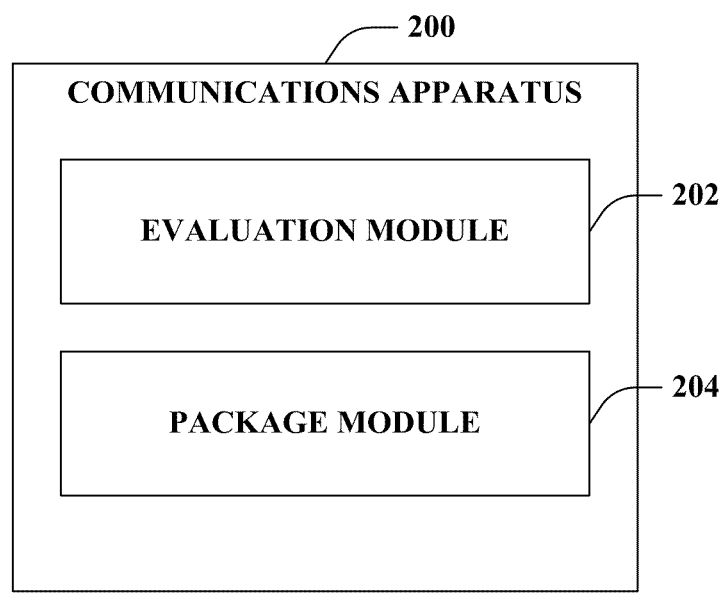
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 employ components described below to package PCFICH information for multiple component carriers in order to optimize decoding and identification of a symbol size for control for each component carrier.

The communications apparatus 200 can include an evaluation module 202 that can evaluate one or more component carriers in order to identify an anchor carrier. It is to be appreciated that the evaluation module 202 can further evaluate the one or more component carriers and/or the anchor carrier (e.g., anchor component carrier) in order to identify Physical Control Format Indicator Channel (PCFICH) information associated with each carrier (e.g., one or more component carriers, anchor carrier, etc.). The communications apparatus 200 can further include a package module 204 that can package the PCFICH information for each carrier into the anchor carrier.

For instance, the PCFICH information can be packaged into at least one of a Multi-Carrier (MC) grant of the Physical Downlink Control Channel (PDCCH). In another example, the package module 204 can create a package of PCFICH information such that the PCFICH information is universal for the one or more component carriers and/or the anchor carrier. In still another example, the package module 204 can create a package of the PCFICH information and communicate via a separate channel in order to eliminate decoding of PCFICH information for each carrier.

Moreover, although not shown, it is to be appreciated that communications apparatus 200 can include memory that retains instructions with respect to evaluating one or more component carriers to identify Physical Control Format Indicator Channel (PCFICH) information related therewith, identifying an anchor component carrier from the one or more component carriers, communicating PCFICH information related to the anchor component carrier and PCFICH information related to each of the one or more component carriers via the anchor component carrier, and the like. Further, communications apparatus 200 can include a processor that may be utilized in connection with executing instructions (e.g., instructions retained within memory, instructions obtained from a disparate source, . . . ).

Additionally, although not shown, it is to be appreciated that communications apparatus 200 can include memory that retains instructions with respect to receiving a PCFICH information via an anchor component carrier, decoding the PCFICH information to identify control information for the anchor component carrier, identifying a PCFICH information corresponding to at least one component carrier in addition to the anchor component carrier, wherein the PCFICH information is received via the anchor component carrier, and the like. Further, communications apparatus 200 can include a processor that may be utilized in connection with executing instructions (e.g., instructions retained within memory, instructions obtained from a disparate source, . . . ).

Figure 3:
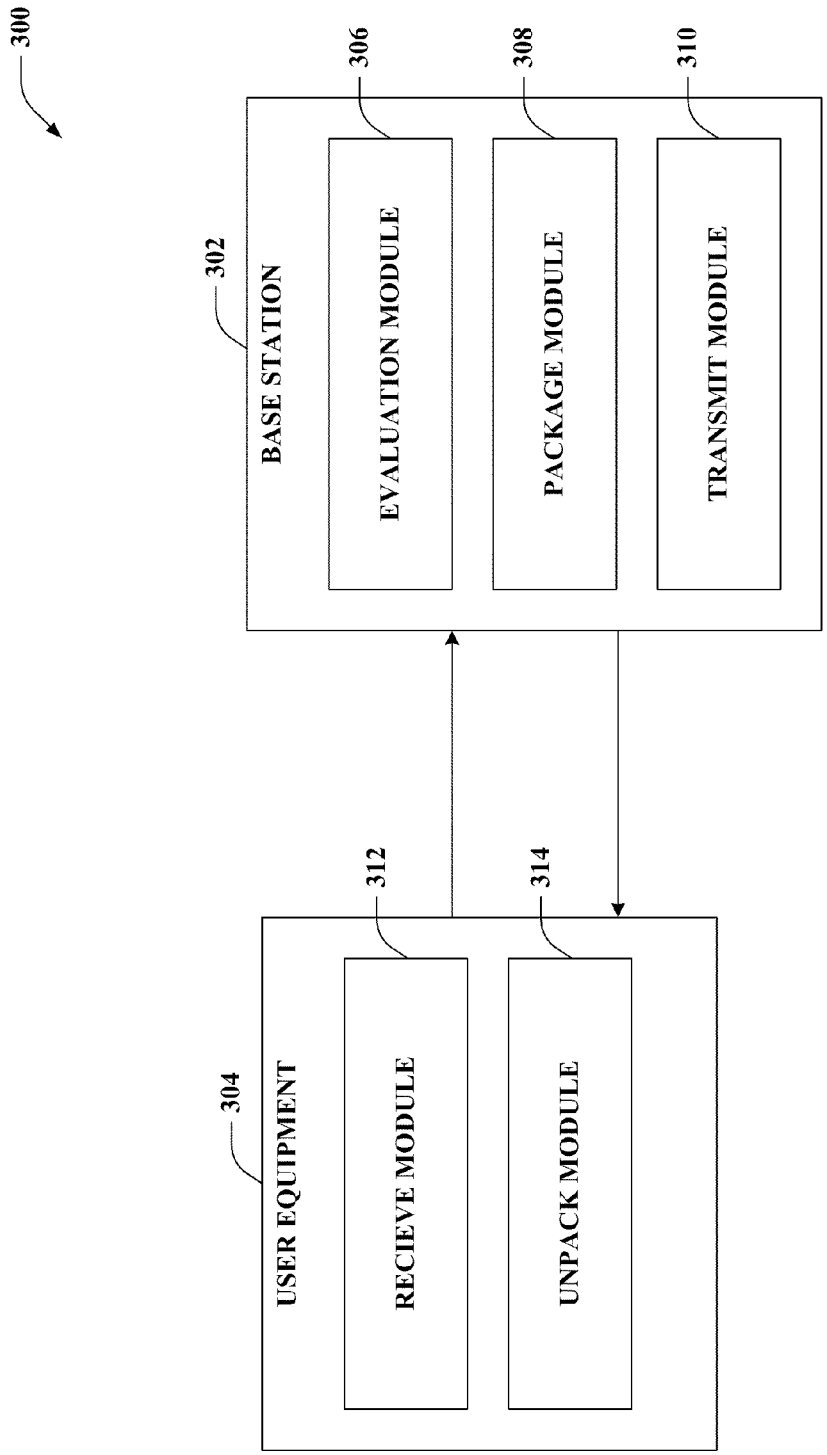
FIG. 3 is an illustration of an example wireless communications system that facilitates communicating PCFICH information for two or more component carriers to define a size of a control region.

Now referring to FIG. 3, illustrated is a wireless communications system 300 that can provide communication of PCFICH information for two or more component carriers to define a size of a control region. The system 300 includes a base station 302 that communicates with a user equipment (UE) 304 (and/or any number of disparate user equipment (not shown)). Base station 302 can transmit information to user equipment 304 over a forward link channel; further base station 302 can receive information from user equipment 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the user equipment 304 as well and vice versa, in one example; the configuration depicted excludes these components for ease of explanation.

Base station 302 includes an evaluation module 306 that can evaluate a carrier in order to identify PCFICH information (e.g. a size for a control region, a symbol for a control region, etc.). Moreover, the evaluation module 306 can identify an anchor carrier from a set of carriers. The base station 302 can further include a package module 308 that can package the PCFICH information for each carrier into the anchor carrier. The package module 308 can package the PCFICH information for each carrier into at least one of a Multi-Carrier (MC) grant of the Physical Downlink Control Channel (PDCCH). The package module 308 can create a package of PCFICH information such that the PCFICH information is universal for the one or more component carriers and/or the anchor carrier. The package module 308 can create a package of the PCFICH information and communicate via a separate channel in order to eliminate decoding of PCFICH information for each carrier. The base station 302 can further include a transmit module 310 that can communicate the PCFICH information to an identified anchor carrier and/or with an identified anchor carrier.

User equipment (UE) 304 can include a receive module 312 that can receive information from an anchor carrier, wherein the information can be PCFICH information related to the anchor carrier and at least one additional carrier. In other words, PCFICH information corresponding to each carrier can be received via the anchor carrier utilizing the receive module 312. User equipment 304 can further include an unpack module 314 that can examine the PCFICH information received and ascertain which PCFICH information corresponds to which carrier. The unpack module 314 can decode the PCFICH information for the anchor carrier to identify the control information and further identify PCFICH information for other carriers without decoding each PCFICH information for each carrier. For example, the unpack module 314 can identify PCFICH information from a package on a separate channel or from a Physical Downlink Control Channel (PDCCH) (e.g., MC grant, separately coded PCFICH information, etc.). Additionally, the unpack module 314 can identify PCFICH information that is universal for the anchor carrier and additional carriers utilized by the user equipment 304.

In LTE backward compatible component carriers, there is a separate Physical Control Format Indicator Channel (PCFICH) sent on each carrier. For LTE non-backward compatible component carriers, there may be no PCFICH transmission. In order to avoid decoding PCFICH on each component carrier, PCFICH information on other (than the one where the MC grant is sent) configured carriers can be incorporated into the MC grant. For time-varying backward compatible/non-backward compatible carrier operation, PCFICH is ON/OFF, respectively.

PCFICH for Multiple-Carriers (MC) can be designed as common PCFICH or independent PCFICH. The common PCFICH enables all component carriers have the same size DL control region (PDCCH). Moreover, the same PCFICH value can be enforced for all carriers (e.g., the substantially same PCFIC signal can be transmitted from all component carriers). For independent PCFICH can enable independent size PDCCH per carrier and control region can be adjusted individually per component carrier.

Common PCFICH can simplify wider bandwidth operation for LTE-A UEs. Moreover, the common PCFICH imposes scheduling restrictions for Rel-8 UEs. The common PCFICH can lead to inefficient resource utilization. Additionally, the common PCFICH can be a sensible solution for LTE-A only carriers where the control channel is distributed across some carriers. On non-anchor carriers, where the control reception is impaired, a fixed PCFICH value on the corresponding carriers can be assumed, without explicitly decoding the corresponding PCFICH(s). That value can be set to 3 symbols, as the maximum possible value. The fixed PCFICH value for PDSCH decoding can be broadcasted, signaled by dedicated signaling, or hard-coded at one value.

Independent PCFICH can be a preferred approach that optimizes the PDCCH overhead especially when the traffic load among component carriers is different. The independent PCFICH can be needed for range expansion (associating UE with a cell that has a relatively weak DL received signal (RSRP), in order to achieve performance benefits).

In order to avoid decoding of PCFICH on each component carrier, PCFICH information on other configured carriers can be incorporated into the MC grant, wherein the configured carriers are other than the carrier that receives the MC grant (e.g., other than the carrier where the MC grant is sent). Non-backward compatible carriers may not have a TDM control, in which case PCFICH is not configured (e.g., data RBs start at the first OFDM symbol). This can assume the cross-carrier operation. A single carrier grant can be sent on one carrier (e.g., anchor component carrier) and can carry data assignment for other configured carrier. A multicarrier grant can be sent on one carrier (e.g., anchor component carrier) and can carry data assignment for all configured carriers. In other words, PCFICH information for multiple carriers can be transmitted on a single carrier. This can assume the cross-carrier operation. For example, this can be in the form of multicarrier PCFICH (single PCFICH containing the information for all configured carriers), or multiple single carrier PCFICHs-one PCFICH and inside that can be the PCFICH for all the configured carriers.

A single carrier can enable the transmission of the control information and other information carried by PCFICH, wherein such transmission can enable advanced ICIC techniques to be applied. Yet, this can be a possible scenario for the heterogeneous network deployments which can result in bad interference conditions. For example, no ICIC provisioned in Rel-8 for control channels. Additionally, semi-static/adaptive ICIC can be used to manage interference on data. Moreover, relatively static ICIC for control channels is needed. Multicarrier operation with interference 'protected' (anchor) carrier can enable that the control is reliably transmitted on that carrier, providing the control for other carriers where physical transmission of the control may not be reliable/possible. This can allow for range expansion—Macro cell transmits PDCCH at low power on one carrier so as to extend the range of the Pico cell. Furthermore, non-backward compatible carriers may not have a TDM control, in which case there is no PCFICH configured, wherein data RBs always start at the first OFDM symbol.

For time-varying backward compatible/non-backward compatible carrier operation, PCFICH can be ON/OFF, respectively. When in backward compatible carrier operation mode, PCFICH is present and serves its purpose of specifying how many OFDM symbols are taken by PDCCH. When carrier is operating in non-backward compatible mode, blank subframes with CRS and common control channels can be employed and PCFICH is not present. The blank subframes can allow LTE User Equipment (UE) to exist (e.g., measurements, camping, etc.) without receiving any data or dedicated control. For PCFICH not being present, LTE-A UEs do not attempt decoding, LTE UEs do the decoding, and data RBs start from the first OFDM symbol (e.g., intended for LTE-A only UEs).

Moreover, although not shown, it is to be appreciated that base station 302 can include memory that retains instructions with respect to evaluating one or more component carriers to identify Physical Control Format Indicator Channel (PCFICH) information related therewith, identifying an anchor component carrier from the one or more component carriers, communicating PCFICH information related to the anchor component carrier and PCFICH information related to each of the one or more component carriers via the anchor component carrier, and the like. Further, communications apparatus 200 can include a processor that may be utilized in connection with executing instructions (e.g., instructions retained within memory, instructions obtained from a disparate source, . . . ).

Additionally, although not shown, it is to be appreciated that base station 302 can include memory that retains instructions with respect to receiving a PCFICH information via an anchor component carrier, decoding the PCFICH information to identify control information for the anchor component carrier, identifying a PCFICH information corresponding to at least one component carrier in addition to the anchor component carrier, wherein the PCFICH information is received via the anchor component carrier, and the like. Further, communications apparatus 200 can include a processor that may be utilized in connection with executing instructions (e.g., instructions retained within memory, instructions obtained from a disparate source, . . . ).

Figure 4:
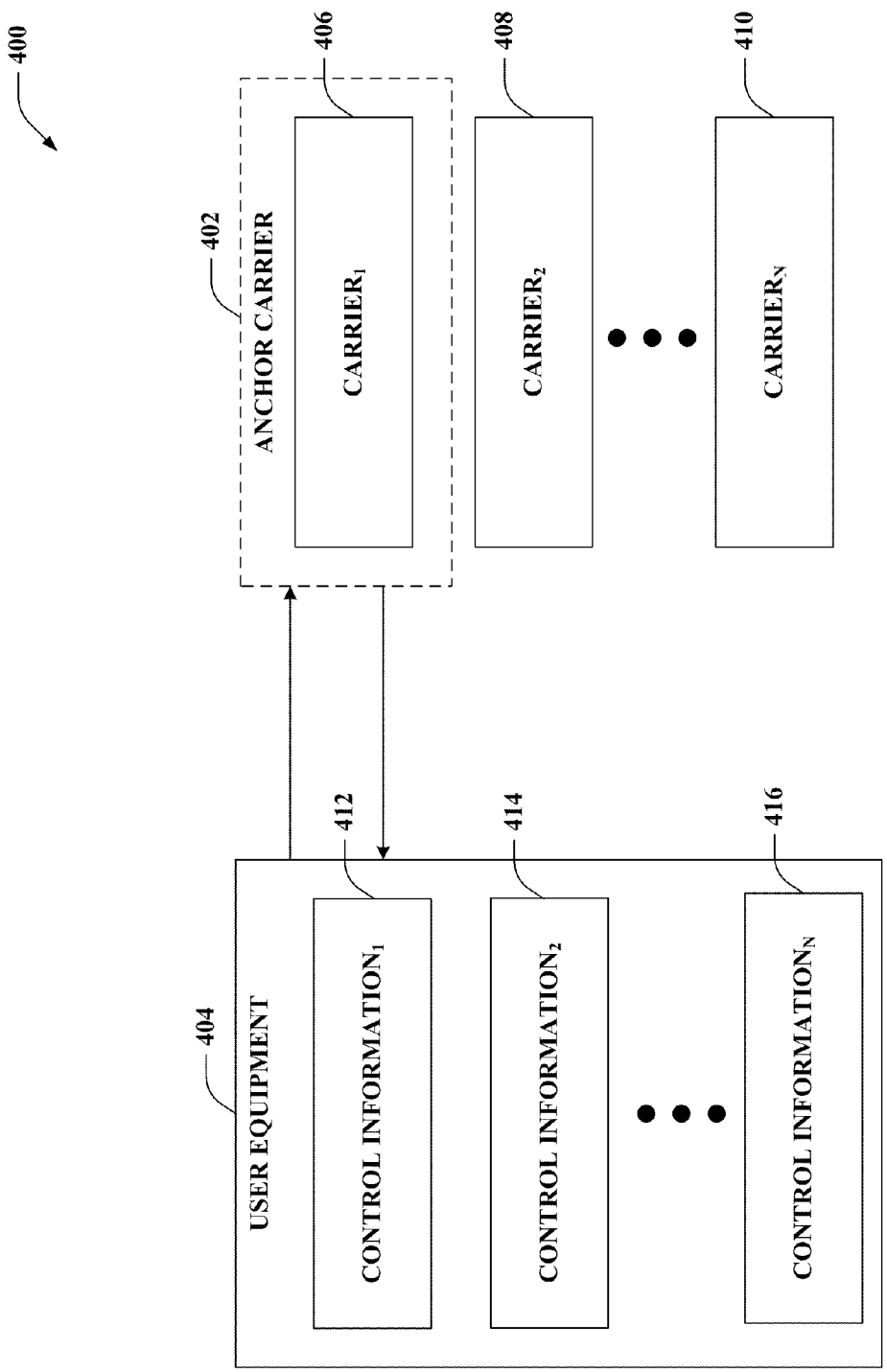
FIG. 4 is an illustration of an example system that facilitates conveying control information for a plurality of component carriers via an anchor carrier.

Now referring to FIG. 4, an example wireless communications system 400 can convey control information for a plurality of component carriers via an anchor carrier. The system 400 can include a user equipment 404 that can leverage multiple carriers (e.g., a carrier can include an amount of resources or a collection of resources, an amount of bandwidth, etc.) such as carrier$_1$ 406, carrier$_2$ 408, and carrier$_N$ 410. It is to be appreciated that there can be any suitable number of carriers such as carrier$_1$ 406 to carrier$_N$ 410, where N is a positive integer. Within multi-carrier operation, an anchor carrier 402 can be utilized to communicate information related to two or more carriers. In the system 400, carrier$_1$ 406 is the anchor carrier 402 that can communicate information related to at least two or more carriers.

In accordance with an aspect of the subject innovation, the user equipment 404 can identify PCFICH information for each carrier, wherein the PCFICH information is communicated for each carrier via the anchor carrier 402. Thus, the user equipment 404 can identify a control information$_1$ 412 to a first carrier, a control information$_2$ 414 to a second carrier, and the like. It is to be appreciated that the user equipment 404 can identify PCFICH information from the anchor carrier 402 for any suitable number of carriers, such as control information$_1$ to control information$_N$, where N is a positive integer.

Figure 5:
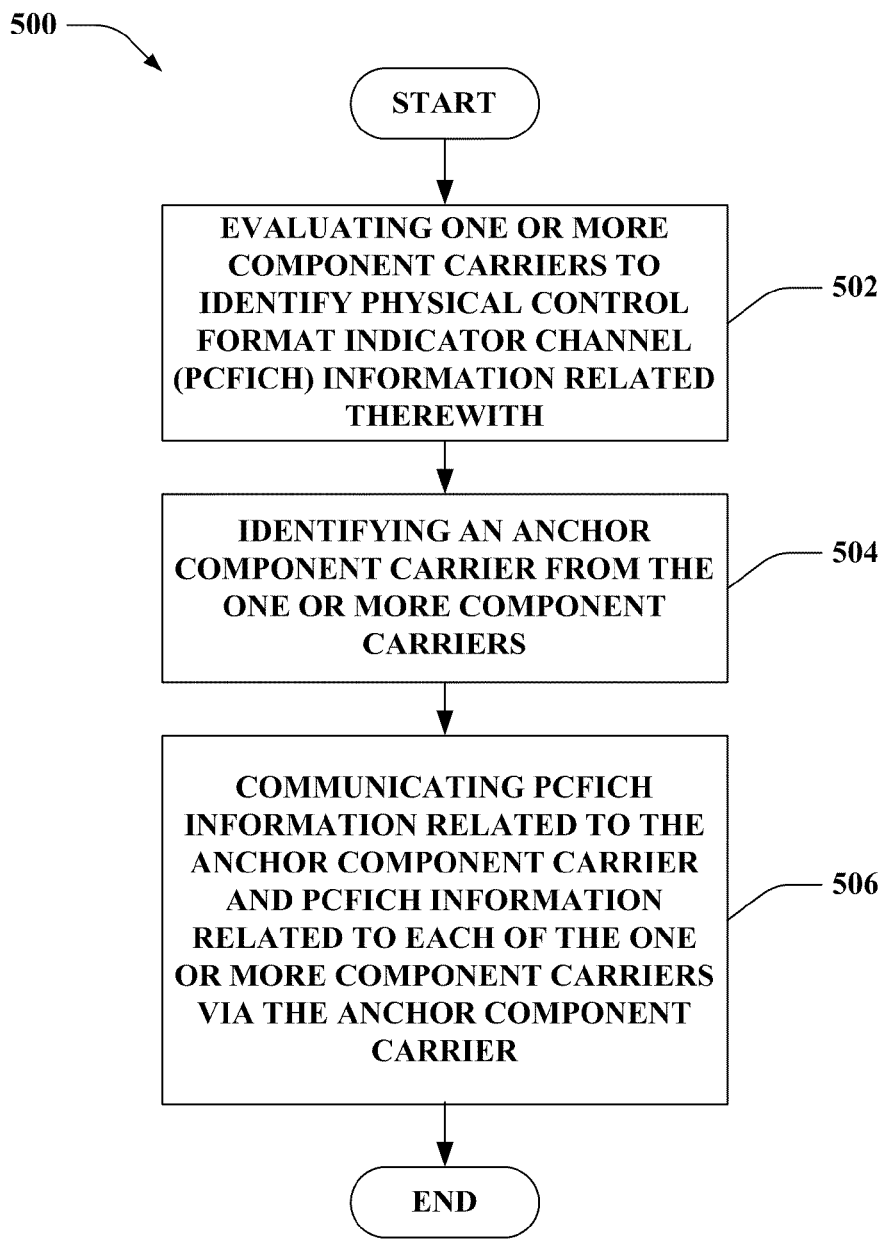
FIG. 5 is an illustration of an example methodology that facilitates conveying control information for one or more component carriers.
Figure 6:
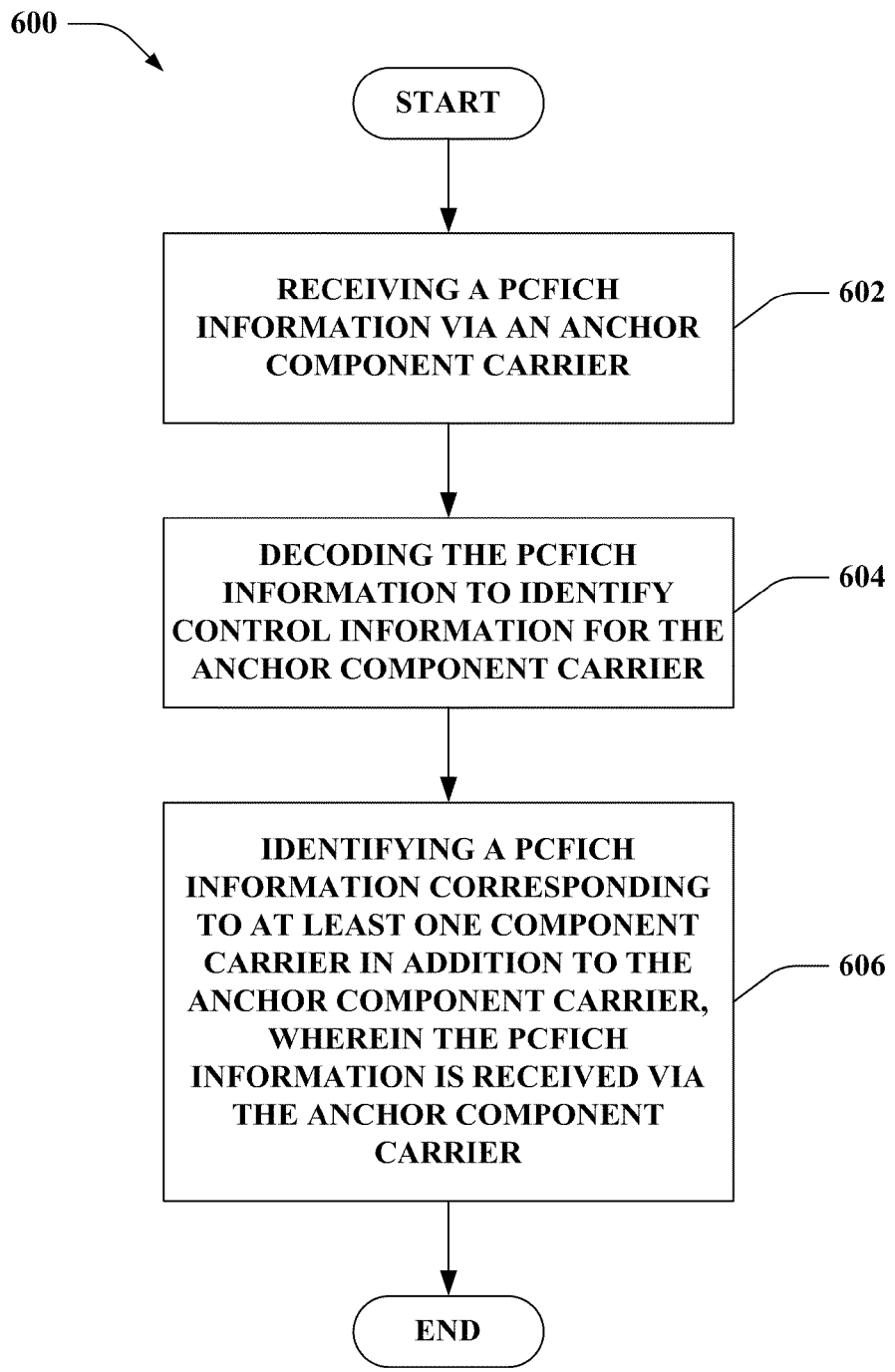
FIG. 6 is an illustration of an example methodology that facilitates utilizing control information for one or more component carriers.

Referring to FIGS. 5-6, methodologies relating to providing communication of PCFICH information are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates conveying control information for one or more component carriers. At reference numeral 502, one or more component carriers can be evaluated to identify Physical Control Format Indicator Channel (PCFICH) information related therewith. At reference numeral 504, an anchor component carrier from the one or more component carriers can be identified. At reference numeral 506, PCFICH information related to the anchor component carrier and PCFICH information related to each of the one or more component carriers can be communicated via the anchor component carrier.

Now referring to FIG. 6, a methodology 600 that facilitates utilizing control information for one or more component carriers. At reference numeral 602, a PCFICH information can be received via an anchor component carrier. At reference numeral 604, the PCFICH information can be decoded to identify control information for the anchor component carrier. At reference numeral 606, a PCFICH information corresponding to at least one component carrier in addition to the anchor component carrier can be identified, wherein the PCFICH information is received via the anchor component carrier.

Figure 7:
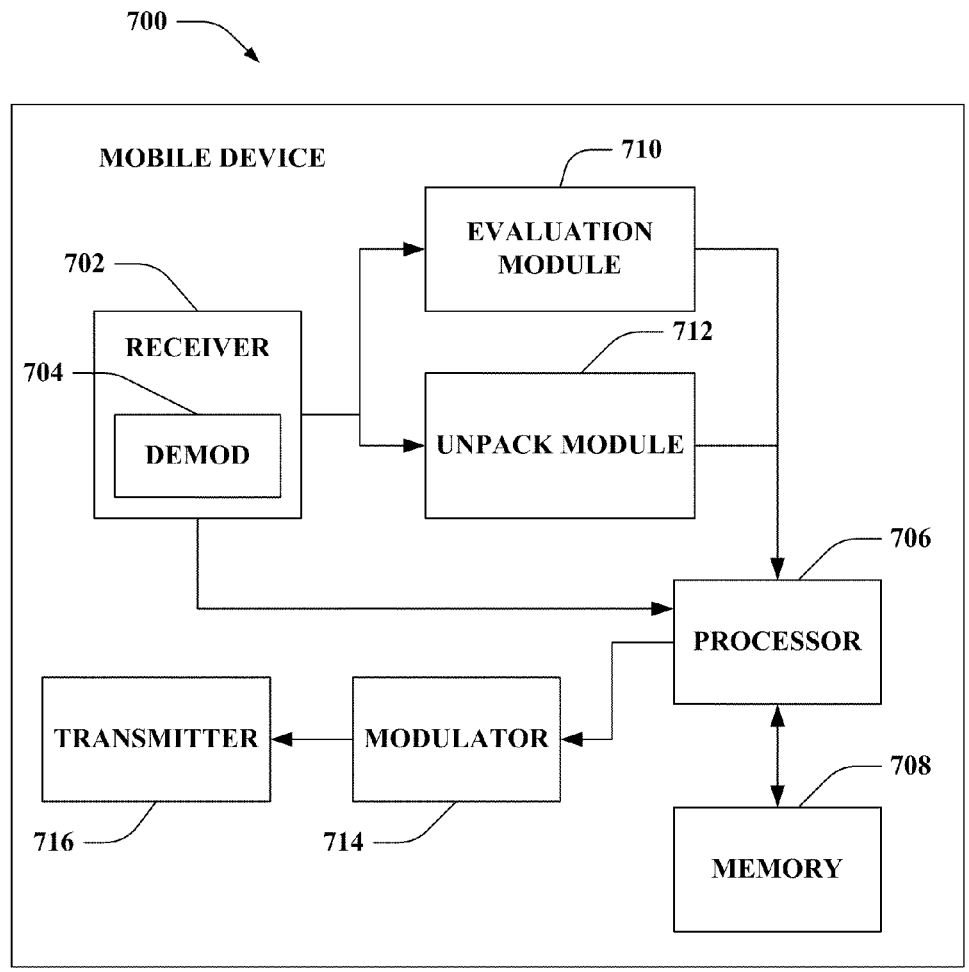
FIG. 7 is an illustration of an example mobile device that facilitates identifying control information for two or more component carriers in a wireless communication system.

FIG. 7 is an illustration of a mobile device 700 that facilitates identifying control information for two or more component carriers in a wireless communication system. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to an evaluation module 710 and/or an unpack module 712. The evaluation module 710 can identify information from an anchor carrier, wherein the information can be PCFICH information related to the anchor carrier and at least one additional carrier. The unpack module 712 can examine the PCFICH information received and ascertain which PCFICH information corresponds to which carrier. For example, the unpack module 712 can identify PCFICH information from a package on a separate channel or from a Physical Downlink Control Channel (PDCCH) (e.g., MC grant, separately coded PCFICH information, etc.). Additionally, the unpack module 712 can identify PCFICH information that is universal for the anchor carrier and additional carriers.

Mobile device 700 still further comprises a modulator 714 and transmitter 716 that respectively modulate and transmit signals to, for instance, a base station, another mobile device, etc. Although depicted as being separate from the processor 606, it is to be appreciated that the evaluation module 710, unpack module 712, demodulator 704, and/or modulator 714 can be part of the processor 706 or multiple processors (not shown).

Figure 8:
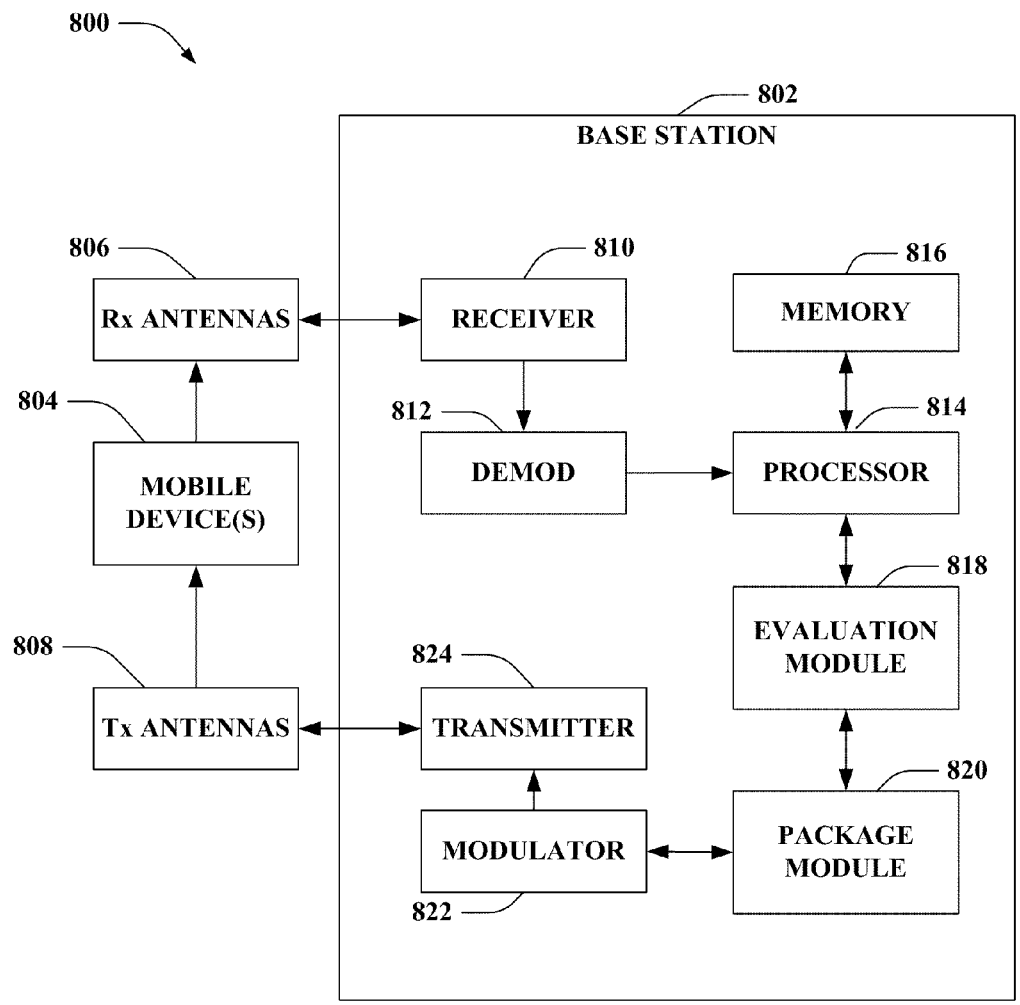
FIG. 8 is an illustration of an example system that facilitates packaging PCFICH information for a plurality of component carriers in a wireless communication environment.

FIG. 8 is an illustration of a system 800 that facilitates packaging PCFICH information for a plurality of component carriers in a wireless communication environment as described supra. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a timing adjustment determiner 818 that can ascertain if mobile devices 804 require timing updates. Moreover, the processor 814 can be coupled to a timing adjustment evaluator 820 that can generate timing adjustment commands that update timing of mobile device 804 according to the identified need.

Processor 814 is further coupled to an evaluation module 818 and/or a package module 820. The evaluation module 818 can evaluate a carrier in order to identify PCFICH information (e.g. a size for a control region, one or more symbols for a control region, etc.). Moreover, the evaluation module 818 can identify an anchor carrier from a set of carriers. The package module 820 can package the PCFICH information for each carrier into the anchor carrier. Furthermore, although depicted as being separate from the processor 814, it is to be appreciated that the evaluation module 818, package module 820, demodulator 812, and/or modulator 822 can be part of the processor 814 or multiple processors (not shown).

Figure 9:
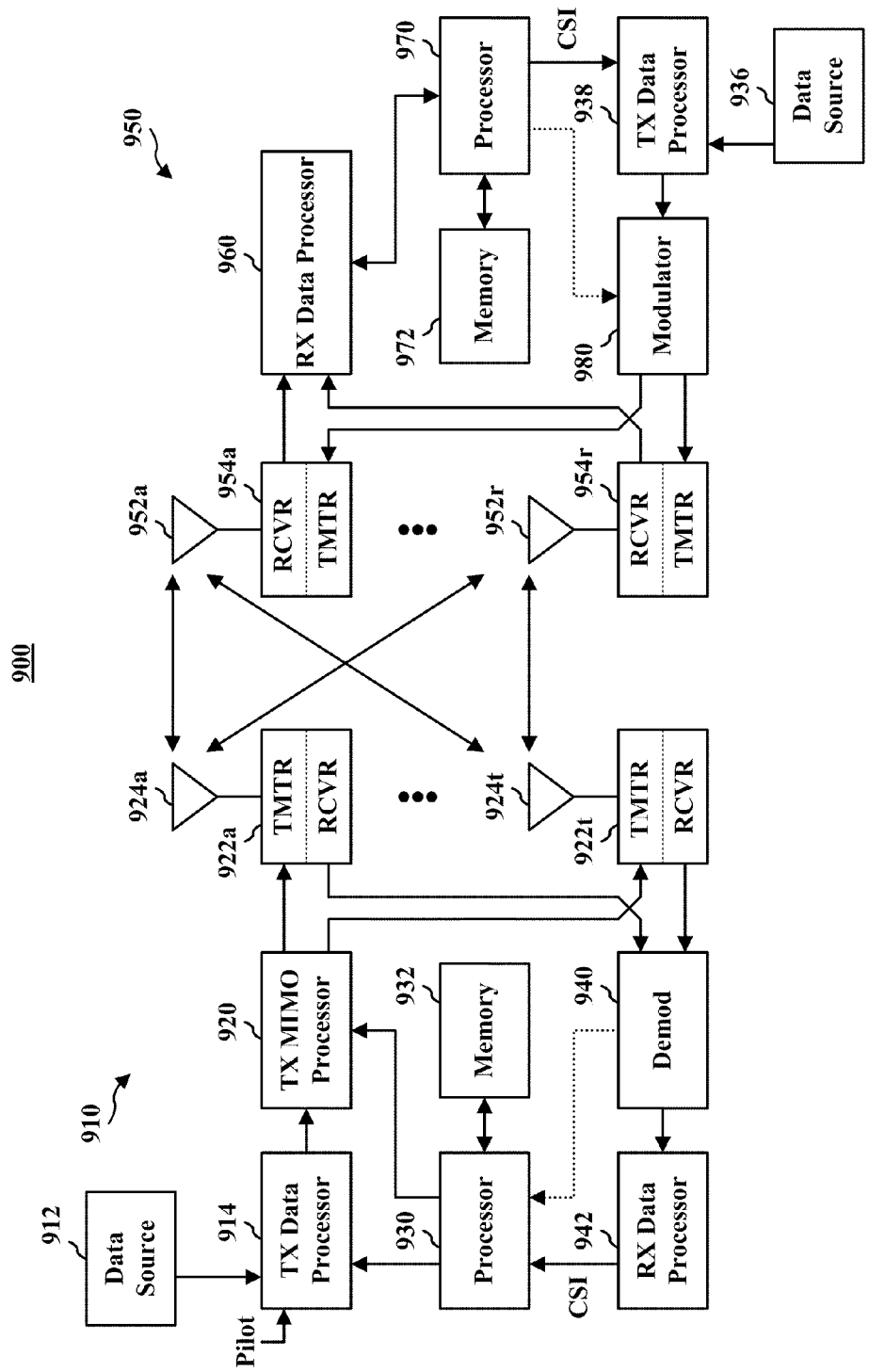
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
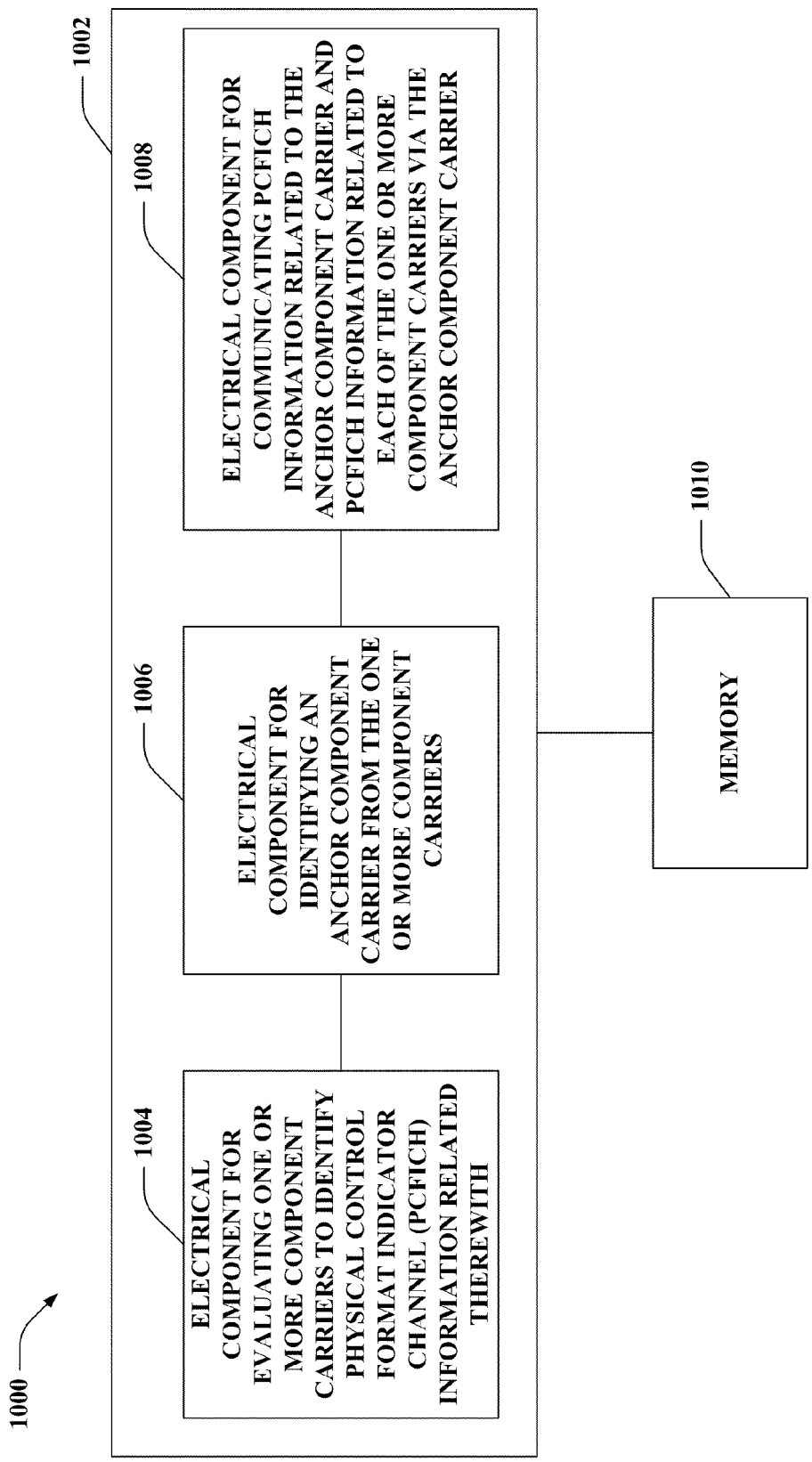
FIG. 10 is an illustration of an example system that facilitates conveying control information for one or more component carriers.

With reference to FIG. 10, illustrated is a system 1000 that conveys control information for one or more component carriers. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. The logical grouping 1002 can include an electrical component for evaluating one or more component carriers to identify Physical Control Format Indicator Channel (PCFICH) information related therewith 1004. In addition, the logical grouping 1002 can comprise an electrical component for identifying an anchor component carrier from the one or more component carriers 1006. Moreover, the logical grouping 1002 can include an electrical component for communicating PCFICH information related to the anchor component carrier and PCFICH information related to each of the one or more component carriers via the anchor component carrier 1008. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
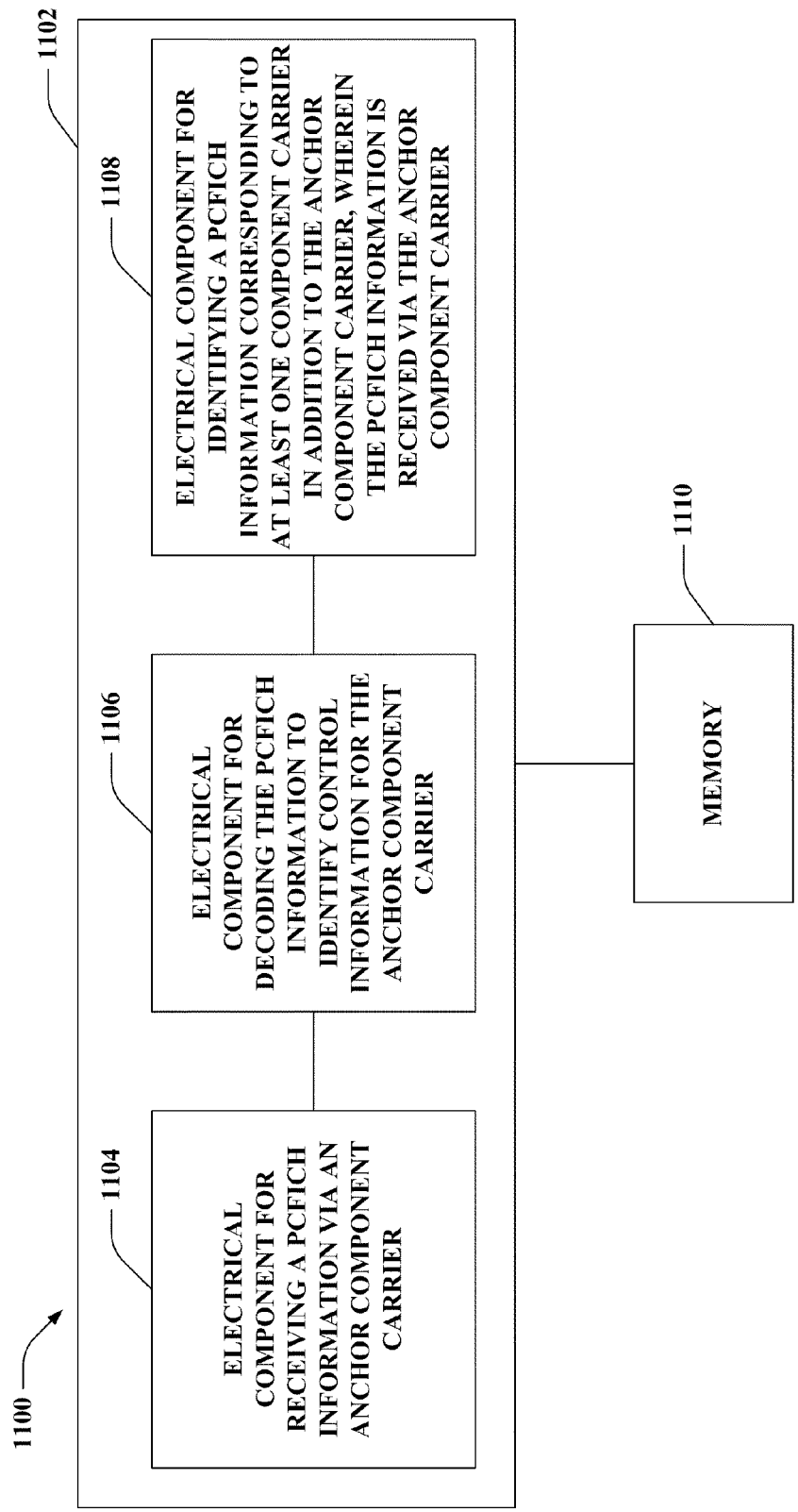
FIG. 11 is an illustration of an example system that utilizing control information for one or more component carriers in a wireless communication environment.

Turning to FIG. 11, illustrated is a system 1100 that utilizes control information for one or more component carriers in a wireless communication environment. System 1100 can reside within a base station, mobile device, etc., for instance. As depicted, system 1100 includes functional blocks that can represent functions implemented by a processor, software, or combination thereof (e.g., firmware). Logical grouping 1102 can include an electrical component for receiving a PCFICH information via an anchor component carrier 1104. Moreover, logical grouping 1102 can include an electrical component for decoding the PCFICH information to identify control information for the anchor component carrier 1106. Further, logical grouping 1102 can comprise an electrical component for identifying a PCFICH information corresponding to at least one component carrier in addition to the anchor component carrier, wherein the PCFICH information is received via the anchor component carrier 1108. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method used in a wireless communications system that facilitates conveying control information for one or more downlink component carriers, comprising:

evaluating a plurality of component carriers to identify related Physical Control Format Indicator Channel (PCFICH) information; and communicating the PCFICH information related to each non-anchor component carrier of plurality of component carriers via dedicated signaling, the PCFICH information comprising separate PCFICH information for each of the non-anchor component carriers, wherein the separate PCFICH information indicates a control region size of each of the non-anchor component carriers, wherein the control region size of a particular one of the non-anchor component carriers is independent of control region sizes of other component carriers of the plurality of component carriers.

2. The method of claim 1, further comprising:

identifying an anchor component carrier from the plurality of component carriers; and communicating PCFICH information related to the anchor component carrier and PCFICH information related to each of the plurality of component carriers.

3. The method of claim 2, wherein the anchor component carrier has a PCFICH information value that is conveyed via an anchor PCFICH sent on the anchor component carrier.

4. The method of claim 1, further comprising:

creating a backward compatible component carrier operation mode that supports Long Term Evolution (LTE) user equipment (UE), wherein the backward compatible component carrier operation mode utilizes the PCFICH information to identify one or more symbols for control;

creating a non-backward compatible component carrier operation mode that does not utilize the PCFICH information; and employing at least one of the backward compatible component carrier operation mode or the non-backward compatible component carrier operation mode based upon a user equipment (UE).

5. A wireless communications apparatus, comprising:

at least one processor configured to:

evaluate a plurality of downlink component carriers to identify related Physical Control Format Indicator Channel (PCFICH) information; and communicate the PCFICH information related to each non-anchor component carrier of the plurality of component carriers via dedicated signaling, the PCFICH information comprising separate PCFICH information for each of the non-anchor component carriers, wherein the separate PCFICH information indicates a control region size of each of the non-anchor component carriers, wherein the control region size of a particular one of the non-anchor component carriers is independent of control region sizes of other component carriers of the plurality of component carriers; and a memory coupled to the at least one processor.

6. The wireless communications apparatus of claim 5, the at least one processor further configured to:

identify an anchor component carrier from the plurality of component carriers; and communicate PCFICH information related to the anchor component carrier and each of the plurality of component carriers.

7. The wireless communications apparatus of claim 5, the at least one processor further configured to:

communicate PCFICH information related to an anchor component carrier via an anchor PCFICH channel on the anchor component carrier.

8. A wireless communications apparatus that conveys control information for one or more component carriers, comprising:

means for evaluating a plurality of component carriers to identify related Physical Control Format Indicator Channel (PCFICH) information; and means for communicating the PCFICH information related to each non-anchor component carrier of the plurality of component carriers via dedicated signaling, the PCFICH information comprising separate PCFICH information for each of the non-anchor component carriers, wherein the separate PCFICH information indicates a control region size of each of the non-anchor component carriers, wherein the control region size of a particular one of the non-anchor component carriers is independent of control region sizes of other component carriers of the plurality of component carriers.

9. The wireless communications apparatus of claim 8, further comprising:

means for identifying an anchor component carrier from the plurality of component carriers; and means for communicating PCFICH information related to the anchor component carrier and each of the plurality of component carriers.

10. The wireless communications apparatus of claim 8, further comprising:

means for creating a backward compatible component carrier operation mode that supports Long Term Evolution (LTE) user equipment (UE), wherein the backward compatible component carrier operation mode utilizes the PCFICH information to identify one or more symbols for control;

means for creating a non-backward compatible component carrier operation mode that does not utilize the PCFICH information; and means for employing at least one of the backward compatible component carrier operation mode or the non-backward compatible component carrier operation mode based upon a user equipment (UE).

11. The wireless communications apparatus of claim 8, further comprising:

communicating PCFICH information related to an anchor component carrier via an anchor PCFICH channel on the anchor component carrier.

12. A computer program product, comprising a non-transitory computer-readable medium, the non-transitory computer-readable medium comprising:

code for causing at least one computer to evaluate a plurality of downlink component carriers to identify related Physical Control Format Indicator Channel (PCFICH) information; and code for causing at least one computer to communicate the PCFICH information related to each non-anchor component carrier of the plurality of component carriers via dedicated signaling, the PCFICH information comprising separate PCFICH information for each of the non-anchor component carriers, wherein the separate PCFICH information indicates a control region size of each of the non-anchor component carriers, wherein the control region size of a particular one of the non-anchor component carriers is independent of control region sizes of other component carriers of the plurality of component carriers.

13. The computer program product of claim 12, further comprising:

code for causing the at least one computer to identify an anchor component carrier from the plurality of component carriers; and code for causing the at least one computer to communicate PCFICH information related to the anchor component carrier and each of the plurality of component carriers.

14. The computer program product of claim 12, further comprising:

code for causing the at least one computer to communicate PCFICH information related to an anchor component carrier via an anchor PCFICH channel on the anchor component carrier.

15. A method used in a wireless communications system that facilitates utilizing control information for one or more component carriers, comprising:

receiving Physical Control Format Indicator Channel (PCFICH) information related to each non-anchor component carrier of a plurality of component carriers via dedicated signaling, the PCFICH information comprising separate PCFICH information for each of the non-anchor component carriers, wherein the separate PCFICH information indicates a control region size of each of the non-anchor component carriers, wherein the control region size of a particular one of the non-anchor component carriers is independent of control region sizes of other component carriers of the plurality of component carriers; and decoding the PCFICH information to identify control information for the non-anchor component carriers.

16. The method of claim 15, further comprising:

wherein one or more component carriers is an anchor component carrier; and identifying a PCFICH information corresponding to at least one component carrier in addition to the anchor component carrier.

17. The method of claim 16, further comprising:

utilizing the PCFICH information related to the anchor component carrier to identify one or more symbols for control for such anchor component carrier; and utilizing the PCFICH information corresponding to the component carrier to identify one or more symbols for control for such component carrier.

18. The method of claim 15, further comprising:

identifying a user equipment (UE) as at least one of backward compatible or non-backward compatible;

employing a backward compatible component carrier operation mode for the user equipment (UE) that supports Long Term Evolution (LTE) user equipment (UE), wherein the backward compatible component carrier operation mode utilizes the PCFICH information to identify one or more symbols for control if the user equipment is backward compatible; and employing a non-backward compatible component carrier operation mode for the user equipment (UE) and does not utilize the PCFICH information if the user equipment (UE) is non-backward compatible.

19. A wireless communications apparatus, comprising:
at least one processor configured to:
receive Physical Control Format Indicator Channel (PCFICH) information related to each non-anchor component carrier of a plurality of component carriers via dedicated signaling, the PCFICH information comprising separate PCFICH information for each of the non-anchor component carriers, wherein the separate PCFICH information indicates a control region size of each of the non-anchor component carriers, wherein the control region size of a particular one of the non-anchor component carriers is independent of control region sizes of other component carriers of the plurality of component carriers; and
decode the PCFICH information to identify control information for the non-anchor component carriers; and
a memory coupled to the at least one processor.

20. The wireless communications apparatus of claim 19, further comprising:
at least one processor configured to:
wherein one or more component carriers is an anchor component carrier; and
identify a PCFICH information corresponding to at least one component carrier in addition to the anchor component carrier.

21. A wireless communications apparatus that utilizes control information for one or more component carriers, comprising:
means for receiving Physical Control Format Indicator Channel (PCFICH) information related to each non-anchor component carrier of a plurality of component carriers via dedicated signaling, the PCFICH information comprising separate PCFICH information for each of the non-anchor component carriers, wherein the separate PCFICH information indicates a control region size of each of the non-anchor component carriers, wherein the control region size of a particular one of the non-anchor component carriers is independent of control region sizes of other component carriers of the plurality of component carriers; and
means for decoding the PCFICH information to identify control information for the non-anchor component carriers.

22. The wireless communications apparatus of claim 21, further comprising:
wherein one or more component carriers is an anchor component carrier; and
means for identifying a PCFICH information corresponding to at least one component carrier in addition to the anchor component carrier.

23. The wireless communications apparatus of claim 22, further comprising:
means for utilizing the PCFICH information related to the anchor component carrier to identify one or more symbols for control for such anchor carrier; and
means for utilizing the PCFICH information corresponding to the component carrier to identify one or more symbols for control for such component carrier.

24. The wireless communications apparatus of claim 21, further comprising:
means for identifying a user equipment (UE) as at least one of backward compatible or non-backward compatible;
means for employing a backward compatible component carrier operation mode for the user equipment (UE) that supports Long Term Evolution (LTE) user equipment (UE), wherein the backward compatible component carrier operation mode utilizes the PCFICH information to identify one or more symbols for control if the user equipment is backward compatible; and
means for employing a non-backward compatible component carrier operation mode for the user equipment (UE) and does not utilize the PCFICH information if the user equipment (UE) is non-backward compatible.

25. A computer program product, comprising a non-transitory computer-readable medium, the non-transitory computer-readable medium comprising:
code for causing at least one computer to receive Physical Control Format Indicator Channel (PCFICH) information related to each non-anchor component carrier of a plurality of component carriers via dedicated signaling, the PCFICH information comprising separate PCFICH information for each of the non-anchor component carriers, wherein the separate PCFICH information indicates a control region size of each of the non-anchor component carriers, wherein the control region size of a particular one of the non-anchor component carriers is independent of control region sizes of other component carriers of the plurality of component carriers; and
code for causing at least one computer to decode the PCFICH information to identify control information for the non-anchor component carriers.

26. The computer program product of claim 25, further comprising:
wherein one or more component carriers is an anchor component carrier; and
code for causing the at least one computer to identify a PCFICH information corresponding to at least one component carrier in addition to the anchor component carrier.

* * * * *